(12) United States Patent
Yang et al.

(10) Patent No.: US 11,176,053 B2
(45) Date of Patent: Nov. 16, 2021

(54) ROUTING TRAFFIC OF A LOGICAL UNIT TO MULTIPLE BACKEND DATA OBJECTS BASED ON METADATA MAPPING

(71) Applicant: VMware, Inc., Palo Alto, CA (US)

(72) Inventors: Yang Yang, Shanghai (CN); Zhaohui Guo, Shanghai (CN); Haitao Zhou, Shanghai (CN); Zhou Huang, Shanghai (CN); Jian Zhao, Shanghai (CN); Jin Feng, Shanghai (CN)

(73) Assignee: VMware, Inc., Palo Alto, CA (US)

( * ) Notice: Subject to any disclaimer, the term of this patent is extended or adjusted under 35 U.S.C. 154(b) by 63 days.

(21) Appl. No.: 16/653,548

(22) Filed: Oct. 15, 2019

(65) Prior Publication Data

US 2021/0109862 A1 Apr. 15, 2021

(51) Int. Cl.
*G06F 12/10* (2016.01)
*G06F 13/16* (2006.01)

(52) U.S. Cl.
CPC .......... *G06F 12/10* (2013.01); *G06F 13/1668* (2013.01); *G06F 2212/657* (2013.01)

(58) Field of Classification Search
CPC . G06F 12/10; G06F 13/1668; G06F 2212/657
See application file for complete search history.

(56) References Cited

U.S. PATENT DOCUMENTS 8,589,550 B1 * 11/2013 Faibish ................. G06F 3/0659
709/226
9,852,151 B1 * 12/2017 Youngworth ......... G06F 3/0619

* cited by examiner

*Primary Examiner* — Michelle T Bechtold (57) ABSTRACT

The disclosure herein describes enabling use of a logical unit for data storage in a distributed storage system using a plurality of backend data objects. Based on receiving instructions to create a logical unit of a logical unit size, a target backend object size to be used with the logical unit is determined, and a plurality of backend objects for allocation to the logical unit is calculated. The backend objects are allocated to the logical unit and a metadata mapping associated with the logical unit is generated. The metadata mapping associates logical block addresses of the logical unit to the allocated backend objects. The logical unit is linked with the metadata mapping in an input/output (I/O) service and, based on the linked metadata mapping, I/O traffic is routed to and from the logical unit. Using multiple backend objects enhances flexibility and efficiency of data storage on the distributed storage system.

20 Claims, 6 Drawing Sheets

ROUTING TRAFFIC OF A LOGICAL UNIT TO MULTIPLE BACKEND DATA OBJECTS BASED ON METADATA MAPPING

BACKGROUND

In some modern computer interface services, such as Internet small computer systems interfaces (iSCSI) target services, logical units are created and managed to store data using a single backend object. The use of a single backend object creates challenges with respect to the performance of the associated services. Backend objects have a maximum size, which effectively limits the total size of the data that can be stored by the service. For instance, a virtual storage area network (vSAN) backend object has a maximum size of 62 terabytes (TB). Further, the input/output (I/O) performance of a logical unit that uses a single, large backend object is reduced compared to the performance that is possible with a relatively smaller object, and resizing the logical unit and associated backend object requires the service to be interrupted. In a resizing operation example with a vSAN iSCSI service, for instance, the data service to the logical unit is paused, the handler to the backend object is released, and the resizing operation is then performed on the backend object. After the resizing operation is complete, the handler to the resized object is reengaged and the service resumes operation. This process may cause substantial downtime for the I/O operations of the service.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 6, the systems are illustrated as schematic drawings. The drawings may not be to scale.

DETAILED DESCRIPTION

Aspects of the disclosure provide a method and system for enabling use of a logical unit for data storage in a distributed storage system using a quantity of backend data objects. Instructions to create the logical unit, including a logical unit size, are received and a target backend object size is determined. A quantity of backend objects to be allocated to the logical unit is calculated based on the logical unit size and the target backend object size, and the calculated quantity of backend objects is allocated to the logical unit. A metadata mapping associated with the logical unit is then generated. The metadata mapping associates logical block addresses of the logical unit to the allocated backend objects. The associations include metadata tuples for each allocated backend object that include a backend object identifier and a logical block address range. The generated metadata mapping is linked to the logical unit in an input/output (I/O) service of the distributed system, and I/O traffic associated with the logical unit is routed based on the linked metadata mapping.

The disclosure operates in an unconventional way by creating and using multiple backend objects to store the data of an I/O service, thereby bypassing the size limits of a single backend object and improving the performance of the I/O service. For instance, in a virtual storage area network (vSAN) system, the storage capacity of a logical unit may be expanded beyond a limit (e.g., 62 TB) by dividing the storage capacity between multiple backend objects as described. Further, the target backend object size may be configured such that the size of each backend object is relatively small to take advantage of faster I/O performance associated with such object sizes. Further, because there are multiple backend objects, I/O operations may be performed in parallel on different backend objects at the same time. Additionally, a logical unit using the multiple backend objects as described herein may be resized without completely suspending the I/O operations of the logical unit because a resizing operation may be configured to only affect a subset of the backend objects (e.g., only the last object of the quantity of backend objects and any additional objects that need to be created may be affected by a resizing operation). The backend objects which are not affected by the resizing operation may continue to operate, thereby reducing or eliminating downtime of the service based on resizing. This is important for real-time critical workloads on the I/O service.

Figure 1:
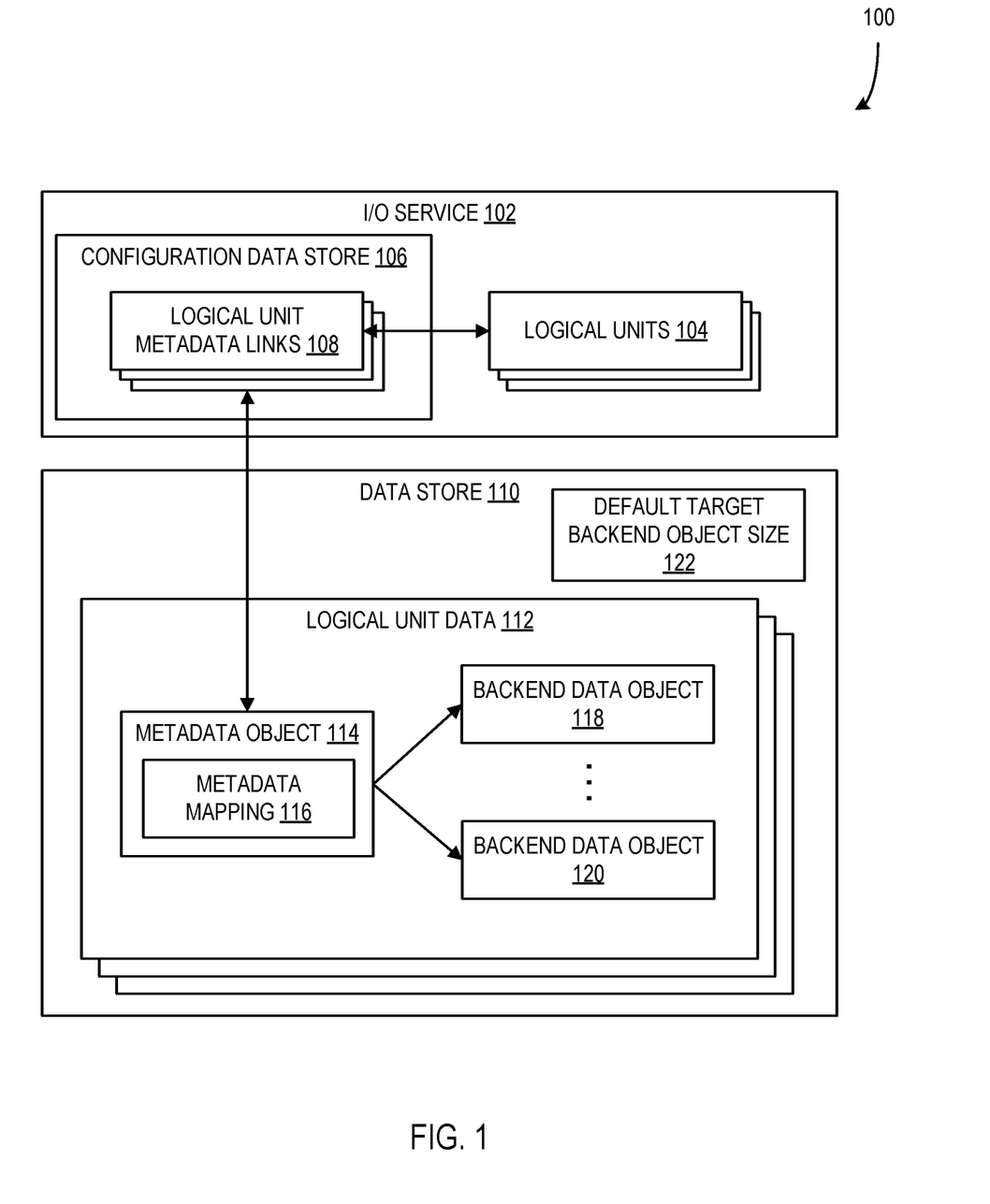
FIG. 1 is a block diagram illustrating a system configured for creating and managing logical units using multiple backend data objects according to an embodiment.

FIG. 1 is a block diagram illustrating a system 100 configured for creating and managing logical units 104 using multiple backend data objects 118-120 according to an embodiment. The system 100 includes an I/O service 102 that reads data from and writes data to a data store 110 based on received input and output requests or instructions. In some examples, the I/O service 102 is an Internet small computer service interface (iSCSI) service, but in other examples, other types of I/O service 102 may be used without departing from the description herein. The I/O service 102 is configured to make use of logical units 104 to address and/or otherwise interact with data in the data store 110. In some examples, each logical unit 104 is identified by a logical unit number (LUN) and, further, the "LUN" acronym may be used to refer to the logical unit 104 itself (e.g., a specific logical unit 104 may be referred to as LUN 104). As a result, it should be understood that the term "LUN" may be used to refer to logical units throughout the description herein.

The I/O service 102 further includes a configuration data store 106 configured for storing data associated with the configuration and/or settings of the I/O service 102, including the logical unit metadata links 108 associated with the logical units 104 of the I/O service 102. It should be understood that the configuration data store 106 may also be used to store any other configuration data of the I/O service 102 as would be understood by a person of ordinary skill in the art without departing from the description herein. The logical unit metadata links 108 are each configured to link a specific logical unit 104 to a metadata object 114 of logical unit data 112 on the data store 110 as described herein. In some examples, the logical unit metadata links 108 include an identifier of a logical unit 104 (e.g., a logical unit number or LUN) and an address, identifier, and/or other identifying information of the associated metadata object 114. The I/O service 102 is configured to use the logical unit metadata links 108, during the processing and/or routing of I/O requests and/or other I/O traffic, to identify a metadata object 114 associated with a logical unit 104 that is the target of the I/O requests being processed. The logical unit metadata links 108 enable the I/O service 102 to route I/O to and from the logical unit data 112 of the logical unit 104 using the metadata object 114 and associated backend data objects 118-120 as described herein.

The data store 110 includes software, firmware, and/or hardware configured for storing data provided by the I/O service 102 and/or other entities that provide data. In some examples, the data store 110 includes one or more computing devices, such as servers, configured for storing data according to the described structures, including logical unit data 112 for one or more logical units 104 that includes metadata objects 114 and associated backend data objects 118-120. Further, in some examples, the data store 110 is configured to store a default target backend object size 122 (in some examples, this may also be called a "preferred backend object size") that is used during creation and management of the backend data objects 118-120 of the logical unit data 112 as described herein.

As illustrated, each logical unit 104 of the I/O service 102 is associated with a set of logical unit data 112 on the data store 110 and that logical unit data 112 includes a metadata object 114 and a plurality of backend data objects 118-120. In some examples, upon creation of a logical unit 104, the backend data objects 118-120 are each allocated as objects of the size defined as the default target backend object size 122. However, other object sizes may be used for the backend data objects 118-120 in alternative examples. The metadata object 114 of a set of logical unit data 112 includes a metadata mapping 116 (e.g., a LUN metadata table (LMT)). The metadata mapping 116 is configured to enable the I/O service 102 to identify which backend data object 118-120 contains particular logical addresses or address ranges (e.g., based on logical block addressing (LBA)), such that I/O requests or other I/O traffic that target such addresses or address ranges can be performed by accessing the backend data object 118-120 that corresponds to those addresses or address ranges. The metadata mapping 116 is described in greater detail below with respect to FIG. 2.

In virtualization examples, the device or devices that host the I/O service 102, the data store 110, and/or other entities of the system 100 are configured for executing guest systems, such as virtual computing instances (VCIs) (e.g., virtual machines (VMs), containers, or other types of VCIs) and enabling such guest systems to make use of the data store 110 and described data structures for distributed data storage. Alternatively, or additionally, the system 100 is generally operable in non-virtualized implementations and/or environments without departing from the description herein.

Figure 2:
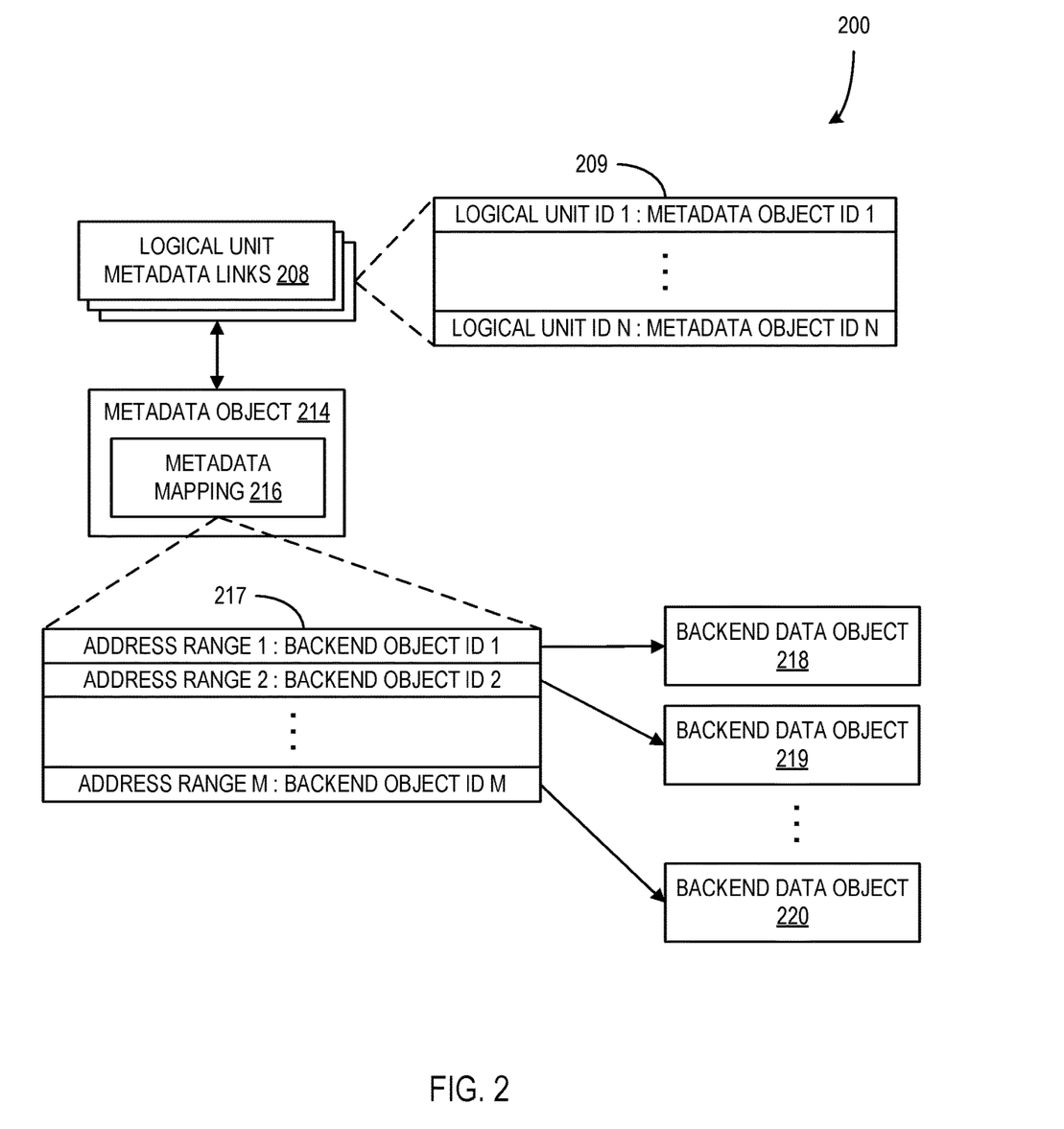
FIG. 2 is a block diagram illustrating metadata relationships between the logical units and backend objects of the system of FIG. 1 according to an embodiment.

FIG. 2 is a block diagram 200 illustrating metadata relationships between the logical units and backend objects of the system of FIG. 1 according to an embodiment. The logical unit metadata links 208 include a list of tuples or mappings 209 from logical unit identifiers to metadata object identifiers. As shown, a "logical unit ID 1" maps to a "metadata object ID 1" and a "logical unit ID N" maps to a "metadata object ID N". In an example, when an I/O request that targets a logical unit with a logical unit ID of N is processed by the I/O service (e.g., I/O service 102), the I/O service accesses the logical unit metadata links 208, identifies the mapping that includes the logical unit ID of N, and uses the metadata object ID associated with the identified logical unit ID during the processing to determine the metadata object 214 to use to access the addressed data location or locations within the backend data objects associated with the metadata object 214.

The metadata mapping 216 of the metadata object 214 includes a list or set of metadata tuples (MTs) 217 that include address ranges (e.g., a start address and an end address indicating an address range between the start address and end address including the start address and/or the end address) mapped to backend object IDs (e.g., the address range 1 mapped to backend object ID 1, the address range 2 mapped to backend object ID 2, and the address range M mapped to backend object ID M). As shown, the backend object ID 1 identifies the backend data object 218, the backend object ID 2 identifies the backend data object 219, and the backend object ID M identifies the backend data object 220. In the previously described example, when the I/O service identifies the metadata object 214 as corresponding to the logical unit identified in the I/O request being processed, the I/O service accesses or otherwise obtains metadata information from the metadata mapping 216. The I/O service compares a target data address of the I/O request to the address ranges of the tuples 217 of the metadata mapping 216 to determine the backend data object of the logical unit that corresponds to the target data address. For example, if the target data address falls in the address range of the tuple 217 that includes the backend object ID 2, the corresponding backend data object is 219. In some examples, the metadata tuples 217 are arranged in an LMT ordered by address range, enabling efficient identification of backend data objects that include target logical block addresses.

The system 100 described herein with respect to FIGS. 1 and 2 is configured to create logical units (e.g., logical units 104) that include the data referencing structure, including the metadata mappings (e.g., mappings 116, 216) of metadata objects (e.g., metadata objects 114, 214), to map the logical block addresses of I/O requests of the I/O service to the multiple backend data objects (e.g., backend data objects 118-120, 218-220) and to enable the I/O service to be built on top of the structure to provide I/O request processing services. When a logical unit is created and its size is larger than the target backend object size (e.g., default target backend object size 122), the data of the logical unit is separated into multiple backend data objects by address range (e.g., consecutive address ranges). The identifiers and address ranges of the multiple backend data objects are stored as tuples in a metadata mapping (e.g., metadata mapping 116, 216), which is then stored in a separate metadata object (e.g., metadata objects 114, 214) with the backend data objects. When separating a large logical unit into the multiple relatively smaller backend data objects, I/O performance of the logical unit can be improved in comparison to the performance of a similar logical unit with a single backend object.

In some examples, logical units created with multiple backend data objects as described herein are resized. If the increased logical unit size fits in the currently allocated number of backend data objects, the address range(s) of the backend data objects in the metadata mapping is adjusted to include the new addresses. For example, the last backend data object of the logical unit may have additional space that is not included in the associated address range before resizing, and resizing may result in the address range of the last backend data object being expanded to include the additional space in the associated metadata mapping tuple. If increasing the size of the logical unit requires additional backend data object(s) to be allocated, the required new backend data objects may be allocated and the metadata mapping of the logical unit is adjusted to include tuples for the newly allocated backend data object. Backend data objects that are unaffected by the resizing process may be used for I/O request processing in parallel with the resizing process, such that I/O requests to the logical unit need not be paused until the resizing process is complete.

Alternatively, or additionally, the metadata tuples (e.g., metadata tuples 217) of the metadata mapping may include additional data. For instance, in some examples, the metadata tuples include a statistics, or "stats", field that is configured to store statistical information associated with the associated backend object, such as read frequency, write frequency, and/or query frequency. Such statistical data may be used for data analysis to identify frequently accessed, or "hot" data. Further, metadata tuples may include an additional attribute or attributes for storing, for instance, basic information about the associated logical unit, such as read/write permissions associated with the address range of the metadata tuple. Other fields or attributes may also be included and/or reserved for use with other types of functionality. Such a metadata tuple may be expressed as "<$lba_s$, $lba_e$, object ID, stats, other attribute(s) . . . >", where the $lba_s$ is the start address of the address range, the $lba_e$ is the end address of the address range, the object ID is the backend object ID of the associated backend data object, and the stats field and other attributes are as described above.

Returning to FIG. 1, in some examples, when the I/O service 102 is started, it initializes each logical unit 104. It goes through all the logical units 104 by opening the metadata object 114 of a logical unit 104 based on the associated logical unit metadata link 108 and loading the metadata mapping 116 (e.g., the LMT) into memory for efficient access. Based on the backend object IDs in the metadata mapping 116, the I/O service 102 opens or otherwise activates each of the backend data objects 118-120 to enable their use during I/O processing by the I/O service 102. The backend data objects 118-120 may be opened in parallel in some instances to increase the efficiency of this process. Once the backend data objects 118-120 are all open or activated, the I/O service 102 is ready to provide I/O processing services using the logical units 104 and associated logical unit data 112 on the data store 110.

Further, in some examples, when a logical unit 104 is created, a user provides the default target backend object size 122 (e.g., in vSAN systems, the default target backend object size 122 is set to 62 terabytes (TB)). Alternatively, or additionally, a user may provide a specific backend object size that is specific to the logical unit 104 being created, such that the specific backend object size is used for the associated logical unit 104 but the default target backend object size 122 is used for other logical units 104 that are not associated with a specific backend object size. If the system 100 includes logical units 104 with different backend object sizes, the backend object size of each logical unit 104 may be included in the metadata mapping 116 of the logical unit 104, enabling the I/O service 102 to determine the backend object size upon accessing the metadata mapping 116. In other examples, the data store 110 includes multiple default target backend object sizes 122 that are associated separate categories of logical units 104, such that the backend object size used with each logical unit 104 is based on the category of the logical unit 104. In most examples, the backend object size of a logical unit 104 remains the same value throughout the lifetime of the logical unit 104.

During creation of a logical unit 104, a requested size of the logical unit 104 is provided. Based on a comparison of this requested size to the backend object size of the logical unit 104, whether a default target backend object size or a specific backend object size, to determine a number of backend data objects required to accommodate the data size of the logical unit 104 being created (e.g., the requested size is divided by the backend object size and a ceiling function is applied to the result or the result is otherwise rounded up to the next full number value). The determined number of backend data objects are then allocated for use with the logical unit 104 being created by the I/O service 102.

If the allocation succeeds, the metadata mapping 116 associated with the logical unit 104 is initialized or otherwise generated. A pseudocode example of generating the metadata mapping 116 is provided below.

```
targetBOS = targetBackendObjectSize( )
len = lengthOf(BackendDataObjects)
lba = 0
MDMap = [ ]
For i = 1 to len do
    lbae = lba + targetBOS
    if lbae > request_size then
        lbae = request_size
    endif
    MDTuple = <lba, lbae, BackendDataObjects[i].id,
emptyStats, emptyExtAttr>
    MDMap.append(MDTuple)
    lba = lba + targetBOS
EndFor
Return MDMap
```

In the pseudocode, "TargetBOS" is set to the target backend object size that has been previously determined for the logical unit 104 being created, "len" is set to the quantity of backend data objects that has previously been determined, the "lba", which represents a logical block address value, is set to zero, and the "MDMap", which represents a metadata mapping 116, is set to an initial, empty metadata mapping. The "for" loop initializes the "MDTuple", representing a metadata tuple, of each backend data object of the logical unit 104. The "lbae" is the end logical block address of the address range of the backend data object, so it is set to a value that is the "lba" plus the "TargetBOS". The "if" statement determines whether the "lbae" is larger than the requested size of the logical unit 104 and, if so, it sets the "lbae" to the last address value of the requested size, ensuring that the backend data objects of the logical unit 104 are limited to include only the requested quantity of addresses. Then, the "MDTuple" is populated with the address range data in the form of "lba" and "lbae", the backend data object ID in the form of "BackendDataObjects[i].id", and initial stats and extra attribute fields in the form of "emptyStats" and "emptyExtAttr". The populated "MDTuple" is then appended to the "MDMap" and the next backend data object is processed via the "for" loop as described. After the "for" loop is complete, the "MDMap" is returned after being populated with an "MDTuple" for each backend data object. In some examples, after the metadata mapping 116 is initialized, is stored on the data store 110 as a metadata object 114 as described herein and the metadata mapping 116 in memory is flushed.

In some examples, a logical unit 104 is resized to enable it to store more data. Increasing the storage size of the logical unit 104 results in one of two situations: either no additional backend data objects need to be allocated to accommodate the new storage size of the logical unit 104 or the increase in storage size results in allocation of at least one additional backend data object.

In a first case, no additional backend data objects need to be allocated to accommodate the new storage size. Assuming the logical unit's current storage size is "currLunSize", the target storage size is "targetLunSize", and the target backend object size is "targetBOS", the following condition is met.

$$targetLunSize \leq \left\lceil \frac{currLunSize}{targetBOS} \right\rceil \times targetBOS$$

In this case, the target storage size of the logical unit still fits within the currently allocated backend data objects (the currLunSize divided by the targetBOS with the ceiling function applied provides the current number of allocated backend data objects and multiplying by the targetBOS provides the total storage size of the allocated backend data objects). Because the target storage size fits within the backend data objects, adjusting the address range of the last backend data object in the metadata mapping of the logical unit is performed and the resizing of the logical unit is complete. For instance, if a user sets the targetBOS to 100 GB and the currLunSize is 250 GB, according to the creation algorithm, three backend data objects are allocated. Each backend data object has a 100 GB storage capacity. Then, the storage size of the logical unit is set to expand to 270 GB (e.g., based on input from the user). Thus, the targetLunSize is 270 GB. In this case, the total storage capacity of the allocated backend data objects is 300 GB, so they can accommodate the targetLunSize space using the allocated three backend data objects. So, only the address range of the third backend data object in the metadata mapping needs to be modified.

In a second case, the following condition is met.

$$targetLunSize > \left\lceil \frac{currLunSize}{targetBOS} \right\rceil \times targetBOS$$

In this case, the target storage size of the logical unit (the targetLunSize) is greater than the storage capacity of the currently allocated backend data objects and additional backend data objects may be allocated to accommodate the new storage size of the logical unit. The process of resizing the logical unit in this case requires a determination of how many backend data objects to allocate and modification of the metadata mapping of the logical unit to account for changes to the address range of the currently allocated backend data objects and for the newly allocated backend data objects. A pseudocode example for expanding such a logical unit with newly allocated backend data objects is provided below.

```
Input -> targetBOS, currLunSize, targetLunSize
allocateSize = targetLunSize - ceiling(currLunSize /
targetBOS) * targetBOS
allocateObjectNum = ceiling(allocateSize / targetBOS)
MDMap.end( ).lbae = MDMap.end( ).lbas + targetBOS
lba = MDMap.end( ).lbae
For i = 1 to allocateObjectNum do
    objectId = allocate object with targetBOS size
```

-continued

```
    lbae = lba + targetBOS
    If lbae > targetLunSize then
        lbae = targetLunSize
    EndIf
    MDTuple = <lba, lbae, objectId, emptyStats,
emptyExtAttr>
        MDMap.append(MDTuple)
        lba = lba + targetBOS
EndFor
Return MDMap
```

In the pseudocode, the targetBOS, currLunSize, and targetLunSize are provided as input to the function. A total storage allocation size ("allocateSize") is determined by subtracting the current storage capacity of the backend data objects of the logical unit from the targetLunSize. A value indicating the number of backend objects to be allocated ("allocateObjectNum") is calculated by dividing the allocateSize by the targetBOS and applying a ceiling function to the result. In the next line, the end address of the address range of the last backend data object in the metadata mapping is adjusted to cover the full capacity of that backend data object. Then, the "lba" variable is initialized to the last address of the currently allocated backend data objects.

The "For" loop iterates through the described process for each backend data object to be allocated. First, a new object is allocated and the identifier of the new object ("objectId") is provided. An end address variable ("lbae") is assigned a value that represents the last possible address value of the new object based on the targetBOS. Then, a check is performed to determine if lbae exceeds the targetLunSize and, if it does, the lbae variable is set to the targetLunSize, such that the address range of the backend objects of the logical unit do not exceed the defined storage size of the logical unit. Then, a tuple ("MDTuple") is populated with the address range data (lba and lbae), an object identifier (objectId), and any additional data that is included in the tuple is instantiated (e.g., "emptyStats" and "emptyExtAttr"). The populated tuple is appended to the metadata mapping ("MDMap") and the lba variable is modified to be the address value of the first address location of the next potential backend object. Once the For loop is completed, the populated metadata mapping is provided, including the metadata tuples of the newly allocated backend data objects.

In the first case, with no backend object allocation, the logical unit resizing may succeed immediately with no I/O pause time from a user's perspective. The expanded address space of the logical unit can also be accessed and used immediately. In the second case, while some backend data objects may be allocated, at least some of the original backend data objects are not touched during the process and, as a result, there is no I/O pause time from a user's perspective with respect to the address space of the original backend data objects.

In many examples, resizing a logical unit 104 to reduce its storage size is not allowed in order to enhance the security and reliability of the data stored thereon. However, in alternative examples, reducing the storage size of a logical unit 104 may be performed by adjusting the metadata mapping 116 of the logical unit 104 and releasing or otherwise freeing backend data objects that are no longer in use by the logical unit 104 without departing from the description herein. Use of the newly allocated address space is accessible after the new backend data objects are allocated as described herein.

In some examples, logical units 104 are removed from the system 100. To remove a logical unit 104, the I/O service 102 is instructed to stop the data service on that logical unit 104. Then the logical unit metadata link 108 between the logical unit 104 and the metadata object 114 is removed from the configuration data store 106. A backend thread/worker process is launched to delete the metadata object 114 and any associated backend data objects 118-120 in a background process. After the removal of the logical unit metadata link 108, the I/O service 102 may continue normal operations with respect to other logical units while the backend process completes cleanup of the logical unit data 112 on the data store 110 without affecting the operations of the I/O service 102.

In some examples, I/O requests that target a logical unit 104 via the I/O service 102 are processed as described herein. When an I/O request is received, a target LBA of the I/O request is accessed. The target LBA is then used to determine the backend data object upon which the target data location is located. Such a determination may include accessing the metadata mapping 116 of the logical unit 104 based on the associated logical unit metadata link 108 and then comparing the address range data of the metadata tuples of the backend data objects 118-120 in the metadata mapping 116 to identify the matching backend data object. Alternatively, the following exemplary formula may be used.

$$objectId = MDMap\left[\left\lfloor \frac{targetLBA}{targetBOS} \right\rfloor\right] \cdot objectId$$

In this formula, the target LBA of the I/O request is divided by the target backend object size of the logical unit and a floor function is applied. The resulting value is used as an index value for the metadata mapping ("MDMap") to access the object ID of the matching backend data object.

Once the backend data object that contains the target LBA has been determined, the physical data location within that backend data object that corresponds with the target LBA is determined. This data location may be determined by subtracting the start address of the determined backend data object from the target LBA of the I/O response, such that the resulting value is an offset value indicating a corresponding location within the backend data object. This calculation is further illustrated by the following exemplary formula.

$$intraObjectLocation = targetLBA - MDMap\left[\left\lfloor \frac{targetLBA}{targetBOS} \right\rfloor\right] \cdot lba_s$$

The I/O service 102 may then use the determined location to process the I/O request.

This described process of getting the object ID and the location within the object is performed in O(1), such that it is always performed in a consistent timeframe. Further, in some examples, all reads to the metadata mapping of the logical unit are done on an in-memory version of the metadata mapping, rather than a mapping stored in a metadata object on the data store or other slower media. In such examples, only writing to or changing the metadata mapping triggers a flush of the metadata mapping change data to the metadata object on the data store apart from any initial download of the metadata mapping to memory. Thus, little or no performance penalty is introduced by using the metadata mapping and associated backend data objects as described herein. Additionally, because there are more backend data objects, I/O requests that target different backend data objects may be sent to those objects and processed in parallel, further improving the I/O performance of the system 100.

Figure 3:
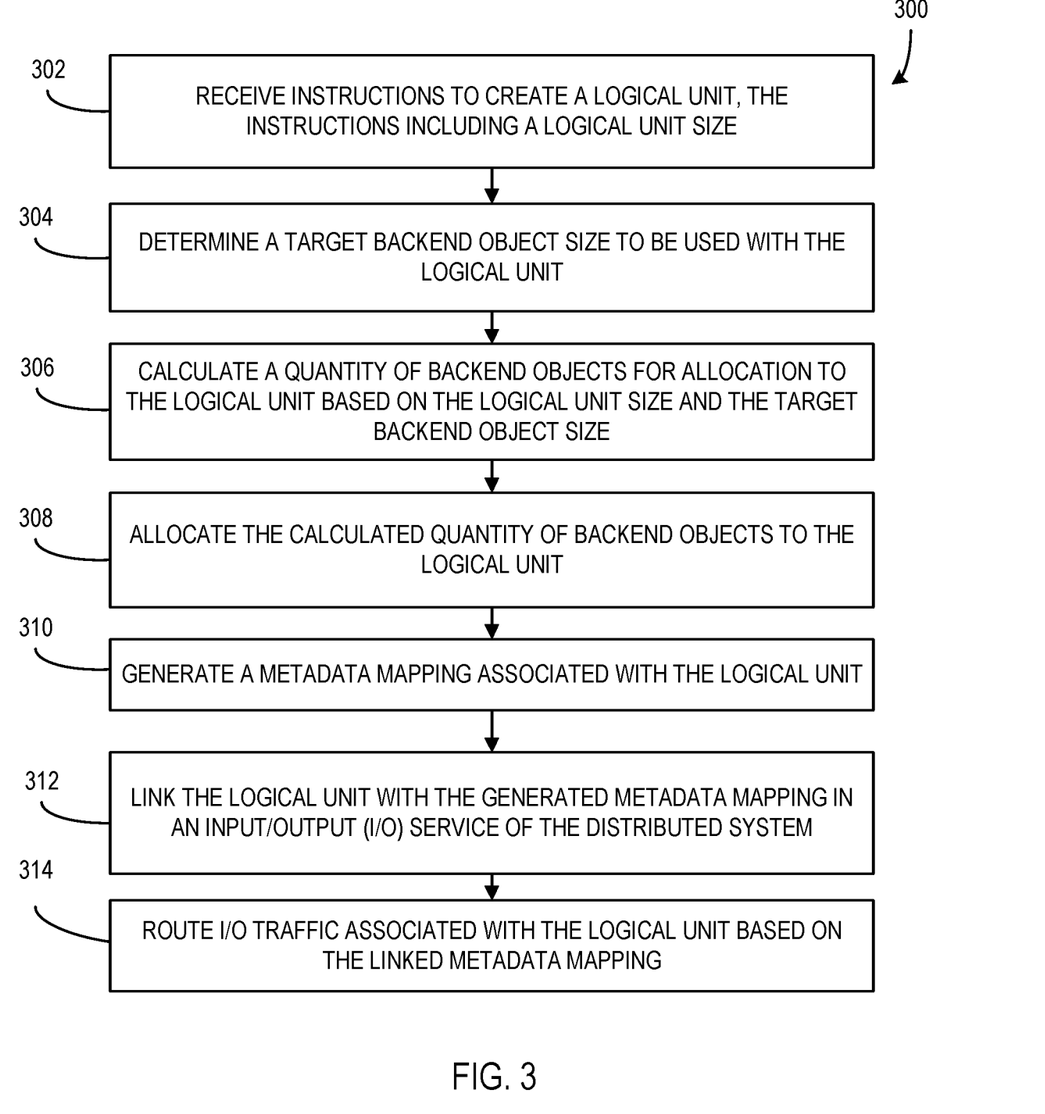
FIG. 3 is a flow chart illustrating a method of creating a logical unit and routing I/O traffic of the logical unit according to an embodiment.

FIG. 3 is a flow chart illustrating a method 300 of creating a logical unit and routing I/O traffic of the logical unit according to an embodiment. In some examples, the method 300 is implemented and/or executed on one or more components of a distributed system such as system 100 (e.g., the I/O service 102, the data store 110) as described herein. At 302, instructions to create a logical unit are received and the instructions include a logical unit size indicating a storage size of the logical unit to be created. The instructions may be received from an operating system (OS), an application, or other entity of the system 100 and it may be based on an automated event and/or based on received user input.

At 304, a target backend object size to be used with the logical unit is determined. In some examples, determining the backend object size includes accessing the data store (e.g., data store 110) and obtaining a default target backend object size (e.g., default target backend object size 122). Alternatively, or additionally, a backend object size different from the default target backend object size may be determined based on input provided in the received request or otherwise obtained based on the logical unit to be created (e.g., a target backend object size associated with a category of the logical unit).

At 306, a quantity of backend objects is calculated for allocation to the logical unit based on the logical unit size and the target backend object size. In some examples, the calculated quantity is based on dividing the logical unit size by the backend object size and applying a ceiling function to ensure that a sufficient quantity of backend objects is allocated to accommodate the storage space of the logical unit. At 308, the calculated quantity of backend objects is allocated to the logical unit. In some examples, the quantity of backend objects is allocated on a single data store (e.g., data store 110). Alternatively, or additionally, the backend objects may be allocated in a distributed data store or data stores, such that the quantity of backend objects may occupy physical storage space in multiple locations throughout the distribute data store(s).

At 310, a metadata mapping associated with the logical unit is generated. The metadata mapping associates logical block addresses of the logical unit to the allocated backend objects, wherein the metadata mapping includes a metadata tuple for each allocated backend object that includes a backend object identifier and a logical block address range associated with the logical unit. In some examples, the tuples are arranged in ascending logical block address range order, but in other examples, other arrangements of tuples and associated backend objects may be used without departing from the description herein.

At 312, the logical unit is linked with the generated metadata mapping in an I/O service (e.g., I/O service 102) of the distributed system. In some examples, the link is stored in a configuration data store (e.g., configuration data store 106) of the I/O service as described herein. The link may be configured to include an identifier of the logical unit and an identifier of the metadata object (e.g., metadata object 114) that includes the generated metadata mapping (e.g., metadata mapping 116).

At 314, I/O traffic associated with the logical unit is routed based on the linked metadata mapping. I/O traffic associated with data at a first logical block address of the logical unit is routed to a first backend object of the quantity of backend objects based on a metadata tuple of the metadata mapping that includes a backend object identifier of the first backend object and a logical block address range that includes the first logical block address. In some examples, routing the I/O traffic includes identifying that the logical unit is the target of the I/O traffic, identifying the metadata mapping of the logical unit based on the link between the logical unit and the metadata mapping, and identifying the backend object to be affected by the I/O traffic based on the metadata mapping as described herein.

Figure 4:
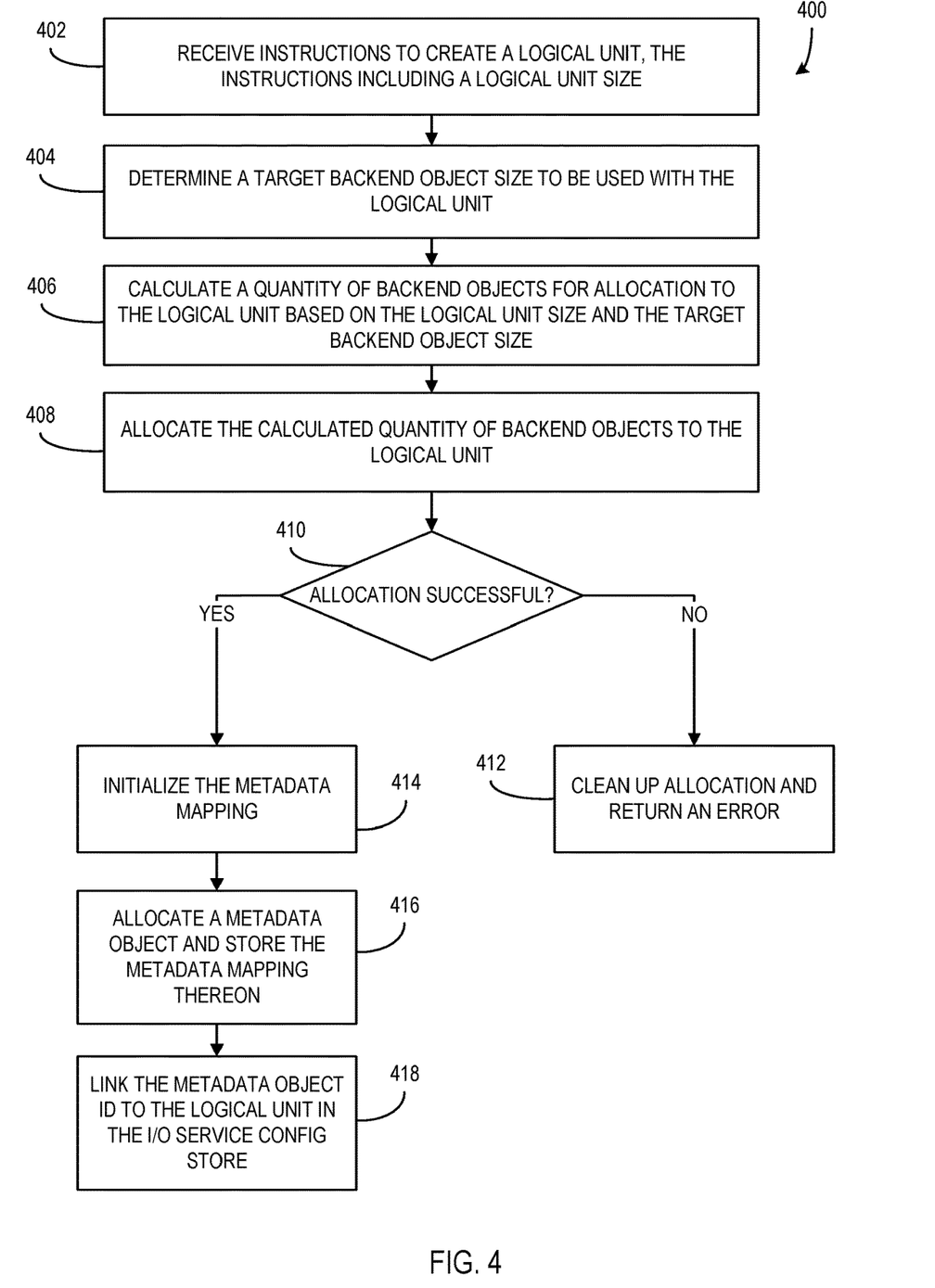
FIG. 4 is a flow chart illustrating a method of creating a logical unit, including handling object allocation failure, according to an embodiment.

FIG. 4 is a flow chart illustrating a method 400 of creating a logical unit, including handling object allocation failure, according to an embodiment. In some examples, the method 400 is implemented and/or executed on one or more components of a distributed system such as system 100 (e.g., the I/O service 102, the data store 110) as described herein. Further, it should be understood that, in some examples, 402-408 of method 400 are performed in substantially the same manner as 302-308 of method 300 in FIG. 3 as described above.

At 410, if the allocation of the quantity of backend objects in 408 is unsuccessful, the process proceeds to 412. Alternatively, if the allocation of the quantity of backend objects in 408 is successful, the process proceeds to 414. It should be understood that the allocation of the quantity of backend objects is unsuccessful if allocation of one or more of the quantity of backend objects fails, as would be understood by a person of ordinary skill in the art. Upon the unsuccessful allocation of one or more of the backend objects, at 412, the allocated objects are cleaned up and an error is returned. In some examples, cleaning up the allocated objects includes at least freeing the storage space allocated to the objects. Further, cleaning up the allocated objects may include other operations or processes for returning the system and/or data store to a state substantially similar to its state prior to attempting to allocate the quantity of backend objects, as would be understood by a person of ordinary skill in the art. Further, the error that is returned may be handled in any manner known in the art without departing from the description herein, and the system and/or entities of the system may respond to the error, including causing the system to retry the method 400, notify a user of the system of the allocation failure, and/or other error handling activities.

At 414, after successful allocation of the quantity of backend objects, the metadata mapping of the logical unit is initialized. In some examples, initializing the metadata mapping includes generating the metadata mapping as described above with respect to 310 of method 300. At 416, a metadata object is allocated on the data store with the allocated backend objects, and the metadata mapping is stored therein. Further, in some examples, the allocation of the metadata object includes a success check that operates in a substantially similar manner as the success check at 410 for the allocation of the quantity of backend objects. After the metadata object is allocated, at 418, the identifier of the metadata object is linked to the logical unit in the I/O service config store (e.g. the configuration data store 106 of FIG. 1).

Figure 5:
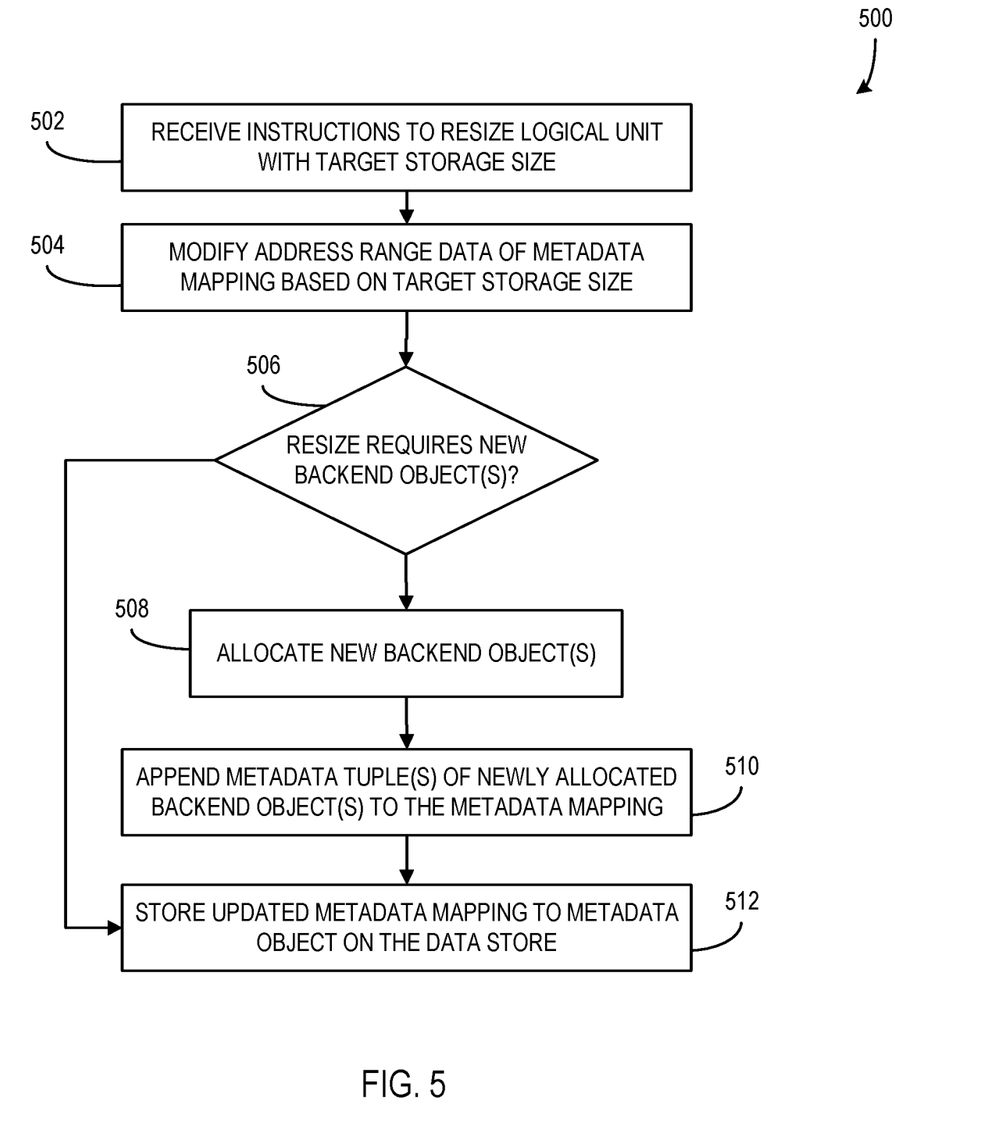
FIG. 5 is a flow chart illustrating a method of resizing a logical unit according to an embodiment.

FIG. 5 is a flow chart illustrating a method 500 of resizing a logical unit according to an embodiment. At 502, instructions to resize the logical unit are received that include the target storage size of the logical unit. Such instructions may be received from one or more other entities of the system and/or may be based on automated processes and/or user input. In some examples, only increasing the size of the logical unit is enabled, as described previously. At 504, the address range data of the metadata mapping of the logical unit is modified based on the target storage size. In some examples, the address ranges of the backend objects are arranged in increasing order, such that only the address range of the backend object with the highest addresses (e.g., the "last" backend object in address range order) is modified to accommodate additional data at this point.

At 506, if the resizing of the logical unit requires new backend objects to be allocated, the process proceeds to 508. Alternatively, if the resizing of the logical unit does not require new backend objects to be allocated, the process proceeds to 512. In some examples, determining whether new backend objects are required includes comparing the current storage size and backend object size of the logical unit to the target storage size of the logical unit to determine whether the current set of backend objects are able to accommodate the target storage size, as described above.

At 508, the new backend objects are allocated for use with the logical unit. The determination of whether new backend objects are necessary at 506 may further include determining a quantity of new backend objects that are necessary. The determined quantity of backend objects is allocated to the logical unit according to any object allocation techniques that would be understood by a person of ordinary skill in the art without departing from the description herein. At 510, metadata tuples of the newly allocated backend objects are appended to the metadata mapping of the logical unit. In some examples, the metadata tuples of the newly allocated backend objects are initialized to include the address range and identifier of the associated, newly allocated backend object. Further, additional tuple data may be initialized as well (e.g., a stats data field) as described herein.

At 512, whether new backend objects have been allocated or not, the updated metadata mapping is stored to the metadata object on the data store. The link between the logical unit and the metadata object may then be used to access the updated metadata mapping and, through it, the updated backend objects. In some examples, updating the metadata mapping at 512 is a critical "commit" operation for the resizing operation. If the system crashes prior to updating the metadata mapping or the update fails for another reason, no change is made to the logical unit and the resizing operation fails. The update process at 512 is an atomic operation as it is a write operation with block size.

Further, in cases where the operation fails, such as a system crash, some stale backend objects may be allocated (e.g., if the system crashes at 510, the backend objects are allocated but the mapping relationship is not stored due to the metadata mapping not being updated at 512). In such cases, there is a backend worker thread that is scheduled to periodically scan and remove such stale backend objects.

Additional Example Scenarios

Aspects of the disclosure enable various additional scenarios, such as next described.

In an example, an iSCSI target service is created with a logical unit size of 25 GB. The target backend object size of the system is set to 10 GB. The total quantity of backend objects to be allocated is determined to be three (e.g., 25 GB divided by 10 GB is 2.5, which is rounded up to three). The three backend objects are allocated to the new logical unit of the target service. The metadata mapping is generated for the logical unit, including three metadata tuples for the corresponding three backend objects. The first backend object is associated with the logical block addresses of the first 10 GB of the logical unit, the second backend object is associated with the logical block addresses of the second 10 GB of the logical unit, and the third backend object is associated with the last 5 GB of the logical unit. The metadata mapping is stored in a metadata object in the data store with the three backend objects and a link to the metadata object is created in the configuration data of the target service. I/O traffic associated with the target service is routed to and/or from the three backend objects of the logical unit based on the metadata mapping in the metadata object.

In a further example, the logical unit of the target service is resized to 28 GB to accommodate additional data. Because the third backend object includes 5 free GB (e.g., the 10 GB backend object includes logical block addresses of 5 GB) and the logical unit is being resized to include an additional three GB, the metadata tuple of the third backend object is updated to include logical block addresses of the three new GB. The updated metadata tuple is included in the metadata mapping of the metadata object. The I/O routing of the target service continues throughout the resizing process.

In another example, the logical unit of the target service is resized to 35 GB to accommodate additional data. In order to complete the resizing of the logical unit, the logical block address range of the third backend object is expanded to include the addresses from 28 GB to 30 GB, such that the third backend object is at a maximum capacity. A fourth backend object is allocated to accommodate the logical block address range from 30 GB to 35 GB and the metadata mapping is updated to include a metadata tuple for the fourth backend object. I/O traffic to the logical block address ranges that are unaffected by the resizing operation is not paused during the resizing operation.

Exemplary Operating Environment

Aspects of the disclosure are operable in both virtualized and non-virtualized environments. In virtualized examples that involve a hardware abstraction layer on top of a host computer (e.g., server), the hardware abstraction layer allows multiple containers to share the hardware resource. These containers, isolated from each other, have at least a user application running therein. The hardware abstraction layer thus provides benefits of resource isolation and allocation among the containers. In some examples, virtual machines (VMs) are used alternatively or in addition to the containers, and hypervisors are used for the hardware abstraction layer. In these examples, each VM generally includes a guest operating system in which at least one application runs.

For the container examples, it should be noted that the disclosure applies to any form of container, such as containers not including a guest operating system (OS), referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources may be isolated, services restricted, and processes provisioned to have a private view of the operating system with their own process ID space, file system structure, and network interfaces. Multiple containers may share the same kernel, but each container may be constrained to only use a defined amount of resources such as CPU, memory and I/O.

Figure 6:
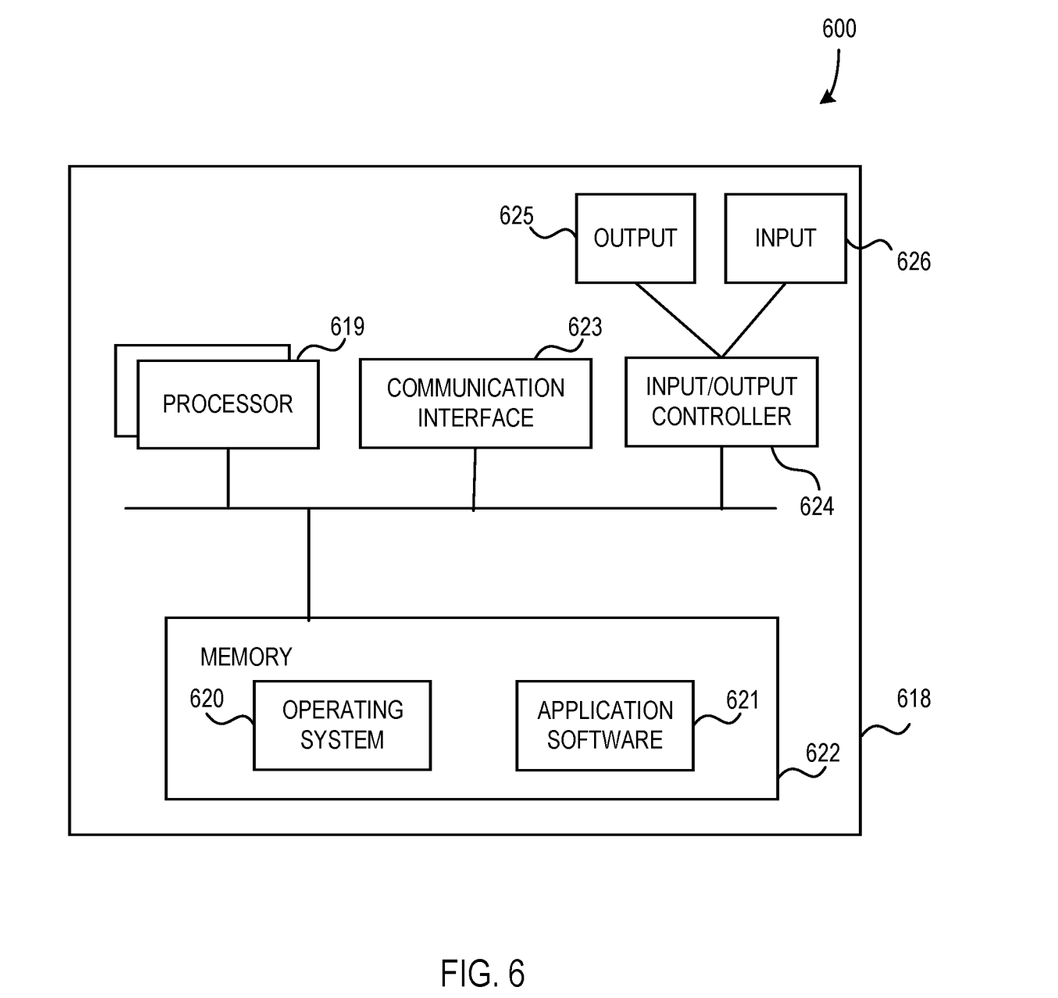
FIG. 6 illustrates a computing apparatus according to an embodiment as a functional block diagram.

The present disclosure is operable with a computing apparatus according to an embodiment as a functional block diagram 600 in FIG. 6. In an embodiment, components of a computing apparatus 618 may be implemented as a part of an electronic device according to one or more embodiments described in this specification. The computing apparatus 618 comprises one or more processors 619 which may be microprocessors, controllers or any other suitable type of processors for processing computer executable instructions to control the operation of the electronic device. Alternatively, or in addition, the processor 619 is any technology capable of executing logic or instructions, such as a hard-coded machine. Platform software comprising an operating system 620 or any other suitable platform software may be provided on the apparatus 618 to enable application software 621 to be executed on the device. According to an embodiment, for creating and using logical units linked to a quantity of backend data objects for data storage in a distributed storage system as described herein may be accomplished by software, hardware, and/or firmware.

Computer executable instructions may be provided using any computer-readable media that are accessible by the computing apparatus 618. Computer-readable media may include, for example, computer storage media such as a memory 622 and communications media. Computer storage media, such as a memory 622, include volatile and non-volatile, removable and non-removable media implemented in any method or technology for storage of information such as computer readable instructions, data structures, program modules or the like. Computer storage media include, but are not limited to, RAM, ROM, EPROM, EEPROM, persistent memory, phase change memory, flash memory or other memory technology, CD-ROM, digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 622) is shown within the computing apparatus 618, it will be appreciated by a person skilled in the art, that the storage may be distributed or located remotely and accessed via a network or other communication link (e.g. using a communication interface 623).

The computing apparatus 618 may comprise an input/output controller 624 configured to output information to one or more output devices 625, for example a display or a speaker, which may be separate from or integral to the electronic device. The input/output controller 624 may also be configured to receive and process an input from one or more input devices 626, for example a keyboard, a microphone or a touchpad. In one embodiment, the output device 625 may also act as the input device. An example of such a device may be a touch sensitive display. The input/output controller 624 may also output data to devices other than the output device, e.g. a locally connected printing device. In some embodiments, a user may provide input to the input device(s) 626 and/or receive output from the output device(s) 625.

The functionality described herein can be performed, at least in part, by one or more hardware logic components. According to an embodiment, the computing apparatus 618 is configured by the program code when executed by the processor 519 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example computer system comprises: at least one processor; and at least one memory comprising computer program code, the at least one memory and the computer program code configured to, with the at least one processor, cause the at least one processor to: receive instructions to create the logical unit, the instructions including a logical unit size; determine a target backend object size to be used with the logical unit; calculate a quantity of backend objects for allocation to the logical unit based on the logical unit size and the target backend object size; allocate the calculated quantity of backend objects to the logical unit; generate a metadata mapping associated with the logical unit, the metadata mapping associating logical block addresses of the logical unit to the allocated backend objects, wherein the metadata mapping includes a metadata tuple for each allocated backend object that includes a backend object identifier and a logical block address range associated with the logical unit; link the logical unit with the generated metadata mapping in an input/output (I/O) service of the distributed system; and route I/O traffic associated with the logical unit based on the linked metadata mapping, whereby I/O traffic associated with data at a first logical block address of the logical unit is routed to a first backend object of the quantity of backend objects based on a metadata tuple of the metadata mapping that includes a backend object identifier of the first backend object and a logical block address range that includes the first logical block address.

A computerized method for enabling use of a logical unit for data storage in a distributed storage system using a quantity of backend data objects, the method comprising: receiving, by a processor, instructions to create the logical unit, the instructions including a logical unit size; determining, by the processor, a target backend object size to be used with the logical unit; calculating, by the processor, a quantity of backend objects for allocation to the logical unit based on the logical unit size and the target backend object size; allocating, by the processor, the calculated quantity of backend objects to the logical unit; generating, by the processor, a metadata mapping associated with the logical unit, the metadata mapping associating logical block addresses of the logical unit to the allocated backend objects, wherein the metadata mapping includes a metadata tuple for each allocated backend object that includes a backend object identifier and a logical block address range associated with the logical unit; linking, by the processor, the logical unit with the generated metadata mapping in an input/output (I/O) service of the distributed system; and routing, by the processor, I/O traffic associated with the logical unit based on the linked metadata mapping, whereby I/O traffic associated with data at a first logical block address of the logical unit is routed to a first backend object of the quantity of backend objects based on a metadata tuple of the metadata mapping that includes a backend object identifier of the first backend object and a logical block address range that includes the first logical block address.

One or more non-transitory computer storage media having computer-executable instructions for enabling use of a logical unit for data storage in a distributed storage system using a quantity of backend data objects that, upon execution by a processor, cause the processor to at least: receive instructions to create the logical unit, the instructions including a logical unit size; determine a target backend object size to be used with the logical unit; calculate a quantity of backend objects for allocation to the logical unit based on the logical unit size and the target backend object size;

allocate the calculated quantity of backend objects to the logical unit; generate a metadata mapping associated with the logical unit, the metadata mapping associating logical block addresses of the logical unit to the allocated backend objects, wherein the metadata mapping includes a metadata tuple for each allocated backend object that includes a backend object identifier and a logical block address range associated with the logical unit; link the logical unit with the generated metadata mapping in an input/output (I/O) service of the distributed system; and route I/O traffic associated with the logical unit based on the linked metadata mapping, whereby I/O traffic associated with data at a first logical block address of the logical unit is routed to a first backend object of the quantity of backend objects based on a metadata tuple of the metadata mapping that includes a backend object identifier of the first backend object and a logical block address range that includes the first logical block address.

Alternatively, or in addition to the other examples described herein, examples include any combination of the following:
- further comprising: receiving, by the processor, instructions to increase the logical unit size of the logical unit, the instructions including a target storage size value; calculating, by the processor, an updated quantity of backend objects of the logical unit based on the logical unit size, the target storage size value, the target backend object size, and the allocated quantity of backend objects; based on the updated quantity of backend objects being larger than the allocated quantity of backend objects, allocating, by the processor, a quantity of backend objects to the logical unit equal to the difference between the updated quantity of backend objects and the allocated quantity of backend objects; and updating, by the processor, the metadata mapping based on the target storage size value and the updated quantity of backend objects.
- further comprising: receiving, by the processor, instructions to remove the logical unit; based on the receive instructions to remove the logical unit, removing, by the processor, the link between the logical unit and the metadata mapping in the I/O service; and activating, by the processor, a background process to remove the metadata mapping and allocated quantity of backend objects from the distributed data store.
- wherein allocating the calculated quantity of backend objects to the logical unit includes allocating multiple backend objects of the quantity of backend objects in parallel processes.
- wherein routing I/O traffic associated with the logical unit based on the linked metadata mapping includes routing I/O traffic to multiple backend objects of the quantity of backend objects in parallel.
- wherein the instructions to create the logical unit further include a defined backend object size that is specific to the logical unit to be created, wherein determining the target backend object size to be used with the logical unit includes accessing the defined backend object size of the instructions.
- wherein each metadata tuple of the metadata mapping further includes at least one of a statistics field for storing statistics data or a write permission field for storing write permission data associated with the backend object identified by the backend object identifier of the metadata tuple.

Any range or device value given herein may be extended or altered without losing the effect sought, as will be apparent to the skilled person.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but with the scope of aspects of the claims constitute exemplary means for receiving, by a processor, instructions to create the logical unit, the instructions including a logical unit size; exemplary means for determining, by the processor, a target backend object size to be used with the logical unit; exemplary means for calculating, by the processor, a quantity of backend objects for allocation to the logical unit based on the logical unit size and the target backend object size; exemplary means for allocating, by the processor, the calculated quantity of backend objects to the logical unit; exemplary means for generating, by the processor, a metadata mapping associated with the logical unit, the metadata mapping associating logical block addresses of the logical unit to the allocated backend objects, wherein the metadata mapping includes a metadata tuple for each allocated backend object that includes a backend object identifier and a logical block address range associated with the logical unit; exemplary means for linking, by the processor, the logical unit with the generated metadata mapping in an input/output (I/O) service of the distributed system; and exemplary means for routing, by the processor, I/O traffic associated with the logical unit based on the linked metadata mapping, whereby I/O traffic associated with data at a first logical block address of the logical unit is routed to a first backend object of the quantity of backend objects based on a metadata tuple of the metadata mapping that includes a backend object identifier of the first backend object and a logical block address range that includes the first logical block address.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for enabling use of a logical unit for data storage in a distributed storage system using a quantity of backend data objects, the system comprising:
    at least one processor; and
    at least one memory comprising computer program code, the at least one memory and the computer program code configured to, with the at least one processor, cause the at least one processor to:
        receive instructions to create the logical unit, the instructions including a logical unit size;
        determine a target backend object size to be used with the logical unit;
        calculate a quantity of backend objects for allocation to the logical unit based on the logical unit size and the target backend object size;
        allocate the calculated quantity of backend objects to the logical unit;
        generate a metadata mapping associated with the logical unit, the metadata mapping associating logical block addresses of the logical unit to the allocated quantity of backend objects, wherein the metadata mapping includes a metadata tuple for each allocated backend object that includes a backend object identifier and a logical block address range associated with the logical unit;
        link the logical unit with the metadata mapping in an input/output (I/O) service of the distributed storage system, including associating an identifier of the logical unit with an identifier of the metadata mapping; and
        route I/O traffic associated with the logical unit based on the linking of the logical unit with the metadata mapping, wherein the metadata mapping is identified based on the association of the identifier of the logical unit and the identifier of the metadata mapping, and I/O traffic associated with data at a first logical block address of the logical unit is routed to a first backend object of the quantity of backend objects based on a metadata tuple of the metadata mapping that includes a backend object identifier of the first backend object and a logical block address range that includes the first logical block address.

2. The system of claim 1, wherein the at least one memory and the computer program code are configured to, with the at least one processor, further cause the at least one processor to:
    receive instructions to increase the logical unit size of the logical unit, the instructions including a target storage size value;
    calculate an updated quantity of backend objects of the logical unit based on the logical unit size, the target storage size value, the target backend object size, and the allocated quantity of backend objects;
    based on the updated quantity of backend objects being larger than the allocated quantity of backend objects, allocate a quantity of backend objects to the logical unit equal to a difference between the updated quantity of backend objects and the allocated quantity of backend objects; and
    update the metadata mapping based on the target storage size value and the updated quantity of backend objects.

3. The system of claim 1, wherein the at least one memory and the computer program code are configured to, with the at least one processor, further cause the at least one processor to:
    receive instructions to remove the logical unit;
    based on the received instructions to remove the logical unit, remove the linking between the logical unit and the metadata mapping in the I/O service; and
    activate a background process to remove the metadata mapping and allocated quantity of backend objects from the distributed storage system.

4. The system of claim 1, wherein allocating the calculated quantity of backend objects to the logical unit includes allocating multiple backend objects of the quantity of backend objects in parallel processes.

5. The system of claim 1, wherein routing I/O traffic associated with the logical unit based on the metadata mapping includes routing I/O traffic to multiple backend objects of the quantity of backend objects in parallel.

6. The system of claim 1, wherein the instructions to create the logical unit further include a defined backend object size that is specific to the logical unit to be created and that differs from a default target backend object size, wherein determining the target backend object size to be used with the logical unit includes accessing the defined backend object size of the instructions, and wherein calculating the quantity of backend objects for allocation includes calculating a quantity of backend objects of the defined backend object size that accommodate the logical unit size.

7. The system of claim 1, wherein each metadata tuple of the metadata mapping further includes at least one of a statistics field for storing statistics data or a write permission field for storing write permission data associated with a backend object identified by the backend object identifier of the metadata tuple.

8. A computerized method for enabling use of a logical unit for data storage in a distributed storage system using a quantity of backend data objects, the method comprising:
    receiving, by a processor, instructions to create the logical unit, the instructions including a logical unit size;

determining, by the processor, a target backend object size to be used with the logical unit;

calculating, by the processor, a quantity of backend objects for allocation to the logical unit based on the logical unit size and the target backend object size;

allocating, by the processor, the calculated quantity of backend objects to the logical unit;

generating, by the processor, a metadata mapping associated with the logical unit, the metadata mapping associating logical block addresses of the logical unit to the allocated quantity of backend objects, wherein the metadata mapping includes a metadata tuple for each allocated backend object that includes a backend object identifier and a logical block address range associated with the logical unit;

linking, by the processor, the logical unit with the metadata mapping in an input/output (I/O) service of the distributed storage system, including associating an identifier of the logical unit with an identifier of the metadata mapping; and routing, by the processor, I/O traffic associated with the logical unit based on the linking of the logical unit with the metadata mapping, wherein the metadata mapping is identified based on the association of the identifier of the logical unit and the identifier of the metadata mapping, and I/O traffic associated with data at a first logical block address of the logical unit is routed to a first backend object of the quantity of backend objects based on a metadata tuple of the metadata mapping that includes a backend object identifier of the first backend object and a logical block address range that includes the first logical block address.

9. The computerized method of claim 8, further comprising:

receiving, by the processor, instructions to increase the logical unit size of the logical unit, the instructions including a target storage size value;

calculating, by the processor, an updated quantity of backend objects of the logical unit based on the logical unit size, the target storage size value, the target backend object size, and the allocated quantity of backend objects;

based on the updated quantity of backend objects being larger than the allocated quantity of backend objects, allocating, by the processor, a quantity of backend objects to the logical unit equal to a difference between the updated quantity of backend objects and the allocated quantity of backend objects; and updating, by the processor, the metadata mapping based on the target storage size value and the updated quantity of backend objects.

10. The computerized method of claim 8, further comprising:

receiving, by the processor, instructions to remove the logical unit;

based on the received instructions to remove the logical unit, removing, by the processor, the linking between the logical unit and the metadata mapping in the I/O service; and activating, by the processor, a background process to remove the metadata mapping and allocated quantity of backend objects from the distributed storage system.

11. The computerized method of claim 8, wherein allocating the calculated quantity of backend objects to the logical unit includes allocating multiple backend objects of the quantity of backend objects in parallel processes.

12. The computerized method of claim 8, wherein routing I/O traffic associated with the logical unit based on the metadata mapping includes routing I/O traffic to multiple backend objects of the quantity of backend objects in parallel.

13. The computerized method of claim 8, wherein the instructions to create the logical unit further include a defined backend object size that is specific to the logical unit to be created and that differs from a default target backend object size, wherein determining the target backend object size to be used with the logical unit includes accessing the defined backend object size of the instructions, and wherein calculating the quantity of backend objects for allocation includes calculating a quantity of backend objects of the defined backend object size that accommodate the logical unit size.

14. The computerized method of claim 8, wherein each metadata tuple of the metadata mapping further includes at least one of a statistics field for storing statistics data or a write permission field for storing write permission data associated with a backend object identified by the backend object identifier of the metadata tuple.

15. One or more non-transitory computer storage media having computer-executable instructions for enabling use of a logical unit for data storage in a distributed storage system using a quantity of backend data objects that, upon execution by a processor, cause the processor to at least:

receive instructions to create the logical unit, the instructions including a logical unit size;

determine a target backend object size to be used with the logical unit;

calculate a quantity of backend objects for allocation to the logical unit based on the logical unit size and the target backend object size;

allocate the calculated quantity of backend objects to the logical unit;

generate a metadata mapping associated with the logical unit, the metadata mapping associating logical block addresses of the logical unit to the allocated quantity of backend objects, wherein the metadata mapping includes a metadata tuple for each allocated backend object that includes a backend object identifier and a logical block address range associated with the logical unit;

link the logical unit with the metadata mapping in an input/output (I/O) service of the distributed storage system, including associating an identifier of the logical unit with an identifier of the metadata mapping; and route I/O traffic associated with the logical unit based on the linking of the logical unit with the metadata mapping, wherein the metadata mapping is identified based on the association of the identifier of the logical unit and the identifier of the metadata mapping, and I/O traffic associated with data at a first logical block address of the logical unit is routed to a first backend object of the quantity of backend objects based on a metadata tuple of the metadata mapping that includes a backend object identifier of the first backend object and a logical block address range that includes the first logical block address.

16. The one or more computer storage media of claim 15, wherein the computer-executable instructions, upon execution by a processor, further cause the processor to at least:

receive instructions to increase the logical unit size of the logical unit, the instructions including a target storage size value;

calculate an updated quantity of backend objects of the logical unit based on the logical unit size, the target storage size value, the target backend object size, and the allocated quantity of backend objects;

based on the updated quantity of backend objects being larger than the allocated quantity of backend objects, allocate a quantity of backend objects to the logical unit equal to a difference between the updated quantity of backend objects and the allocated quantity of backend objects; and update the metadata mapping based on the target storage size value and the updated quantity of backend objects.

17. The one or more computer storage media of claim 15, wherein the computer-executable instructions, upon execution by a processor, further cause the processor to at least:

receive instructions to remove the logical unit;

based on the received instructions to remove the logical unit, remove the linking between the logical unit and the metadata mapping in the I/O service; and activate a background process to remove the metadata mapping and allocated quantity of backend objects from the distributed storage system.

18. The one or more computer storage media of claim 15, wherein allocating the calculated quantity of backend objects to the logical unit includes allocating multiple backend objects of the quantity of backend objects in parallel processes.

19. The one or more computer storage media of claim 15, wherein routing I/O traffic associated with the logical unit based on the metadata mapping includes routing I/O traffic to multiple backend objects of the quantity of backend objects in parallel.

20. The one or more computer storage media of claim 15, wherein the instructions to create the logical unit further include a defined backend object size that is specific to the logical unit to be created and that differs from a default target backend object size, wherein determining the target backend object size to be used with the logical unit includes accessing the defined backend object size of the instructions, and wherein calculating the quantity of backend objects for allocation includes calculating a quantity of backend objects of the defined backend object size that accommodate the logical unit size.

* * * * *